(12) United States Patent
Choi et al.

(10) Patent No.: US 9,137,431 B2
(45) Date of Patent: Sep. 15, 2015

(54) CAMERA HAVING INTERNAL ANTENNA

(71) Applicant: Samsung Electronics Co., Ltd., Gyeonggi-do (KR)

(72) Inventors: Jongmin Choi, Gyeonggi-do (KR); Byounguk Yoon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/975,633

(22) Filed: Aug. 26, 2013

(65) Prior Publication Data

US 2014/0063336 A1   Mar. 6, 2014

(30) Foreign Application Priority Data

Aug. 29, 2012 (KR) ........................ 10-2012-0094639

(51) Int. Cl.
| | |
|---|---|
| *H04N 5/225* | (2006.01) |
| *G03B 17/02* | (2006.01) |
| *H01Q 1/44* | (2006.01) |
| *H01Q 1/22* | (2006.01) |
| *H01Q 1/52* | (2006.01) |
| *H01Q 21/28* | (2006.01) |

(52) U.S. Cl.
CPC .............. *H04N 5/2252* (2013.01); *G03B 17/02* (2013.01); *H01Q 1/44* (2013.01); *G03B 2217/002* (2013.01); *H01Q 1/2266* (2013.01); *H01Q 1/52* (2013.01); *H01Q 21/28* (2013.01)

(58) Field of Classification Search
None
See application file for complete search history.

(56) References Cited

U.S. PATENT DOCUMENTS

| 7,623,180 B2 * | 11/2009 | Ariga ............................ 348/373 |
| 7,889,985 B2 * | 2/2011 | Misawa et al. ................ 396/122 |
| 8,150,256 B2 * | 4/2012 | Nagashiro .................... 396/535 |
| 2011/0065392 A1 * | 3/2011 | Chung et al. ............... 455/67.11 |

FOREIGN PATENT DOCUMENTS

JP          2006217174 A   *   8/2006

OTHER PUBLICATIONS

2011 Old Boys Little Acorn LTL-5210 Camera Review—May 13, 2011, www.chasingame.com.*

* cited by examiner

*Primary Examiner* — Twyler Haskins
*Assistant Examiner* — Angel L Garces-Rivera
(74) *Attorney, Agent, or Firm* — Cha & Reiter, LLC

(57) ABSTRACT

A camera having an internal antenna includes a metal body portion forming an external surface of the camera, excluding one side surface. A non-metallic injection grip portion comprises the one side surface and is fastened to the metal body portion. An antenna portion having at least one radiator is disposed within the injection grip portion. The configuration can allow for a more efficient arrangement of radiators and other components, reduce interference between the antenna and metal components of the camera, and can exhibit an aesthetic appearance.

20 Claims, 13 Drawing Sheets

CAMERA HAVING INTERNAL ANTENNA

CLAIM OF PRIORITY

This application claims the benefit under 35 U.S.C. §119 (a) of a Korean patent application filed on Aug. 29, 2012 in the Korean Intellectual Property Office and assigned Serial No. 10-2012-0094639, the entire disclosure of which is hereby incorporated by reference.

BACKGROUND

1. Technical Field

The present disclosure relates to a camera device having an internal antenna.

2. Description of the Related Art

Recent digital cameras have been provided with an antenna and communication module to allow users to transmit and receive captured still image and video data, as well as other types of information. Because the digital camera can store photographed data at a storage device such as a computer memory, CD-ROM, or USB memory by connecting to a computer or can attach photographed data to an e-mail and transmit the image data to a desired third party, applications for digital cameras have increased.

Nowadays, in the digital camera, as an aesthetic element has a large influence on a product sale, a product's exterior design is recognized as an important an element as a product's performance. Further, as many functions gradually converge to the digital camera, parts increase, but users gradually prefer a design of a simple structure. Therefore, nowadays, digital cameras having various functions have been developed according to various consumer preferences, and a digital camera having an internal antenna module is a typical one of the newly developed digital cameras.

An antenna module housed within the digital camera enables direct multimedia data communication through the camera device. For example, the antenna module may transmit data such as an image and a moving picture photographed through the camera device to another electronic device through a Wi-Fi antenna, or receive position information using satellite information received from a satellite through a GPS module.

A camera device having such a conventional antenna is described with reference to FIG. 1. Conventional camera device 10 has a structure in which only the major front and rear surfaces of a body 13 are made of metal. An upper surface 11, a lower surface 15, and one side surface 12 of the camera device 10 are non-metallic.

In order to achieve a maximum electromagnetic wave gain of a GPS antenna mounted in the camera device 10, the GPS antenna should be mounted near an uppermost surface (i.e., at an uppermost area) of the camera device 10. Therefore, in the conventional camera device 10, the entire upper surface 11 is non-metallic, and in order to realize a requisite antenna radiation performance, a portion of the upper surface 11 is separately covered by injection molding. A conductive material such as a metal deteriorates radiation performance of an antenna by shielding electromagnetic wave radiation and thus a portion adjacent to the antenna should be composed of a non-conductive material.

Further, electromagnetic waves of a Wi-Fi antenna are generally vertically radiated, i.e., the beam peak in a normal use position points vertically. Therefore, in the conventional camera device 10, in order to maximize the gain of the Wi-Fi antenna, the entire upper surface 11 and lower surface 15 of the camera device 10 adjacent to the Wi-Fi antenna is covered with an injection molding material. However, the production process to achieve this construction is not simple and requires a long production time.

Further, a parting line occurs between the metal and the injection molding material, and such a parting line is an element that may seriously tarnish an external appearance of a product and is an important benchmark that can represent a finish level of the product.

Further, when a plurality of antennas are disposed distributed in several areas within the camera device 10, as in the conventional art, the plurality of antennas should be separated by a predetermined distance from an electrical/electronic element such as a main printed circuit board (PCB) or a battery and metal parts inside the camera device. Accordingly, by employing distributed antennas, a problem occurs in that efficiency of an internal layout of the camera device 10 deteriorates. This problem negatively impacts a trend of decreasing a size and a thickness of the camera device.

Therefore, while optimizing various functions converged to a digital camera, development of a camera device that can provide a simple impression and an aesthetic impression to a product external appearance is needed.

SUMMARY

The present disclosure provides a camera device having at least one internal antenna within a non-metallic side portion of the camera, which can exhibit improved antenna performance due to its positioning away from metallic elements of the camera.

The present disclosure further provides a camera device having an internal antenna that can reduce a parting line and enhance an external appearance quality by efficiently disposing a metal cover and an injection cover of an external appearance of the camera device.

The present disclosure further provides a camera device having an internal antenna that can improve a grip feeling when holding the camera device.

A camera device is further provided having an internal antenna that can protect parts inserted and ejected to and from the camera device from an external physical force, an impact, or contamination.

The present disclosure further provides a camera device having an internal antenna that can decrease a size and a thickness and simplify a structure of the camera device.

In accordance with an aspect, a camera having an internal antenna includes a metal body portion forming an external surface of the camera, excluding one side surface. A non-metallic injection grip portion comprises the one side surface and is fastened to the metal body portion. An antenna portion having at least one radiator is disposed within the injection grip portion.

In accordance with another aspect, a camera includes a metal body portion forming an external surface, excluding one side surface of the camera, and for housing a flash module, a speaker module, an autofocus (AF) module, and a tripod module. An injection grip portion encloses the one side surface of the camera and houses an antenna module separated by at least a predetermined distance from the metal body portion. The metal body portion includes a battery cover for covering and accessing a battery, a connector, an SD memory card, and a SIM card, each being separated by at least the predetermined distance internally from the antenna module, and detachably mounted at a lower end portion of the metal body portion to simultaneously cover the battery, connector, SD memory card, and SIM card. The battery cover has an auxiliary cover for independently opening and closing to access the connector in a portion of the battery cover.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
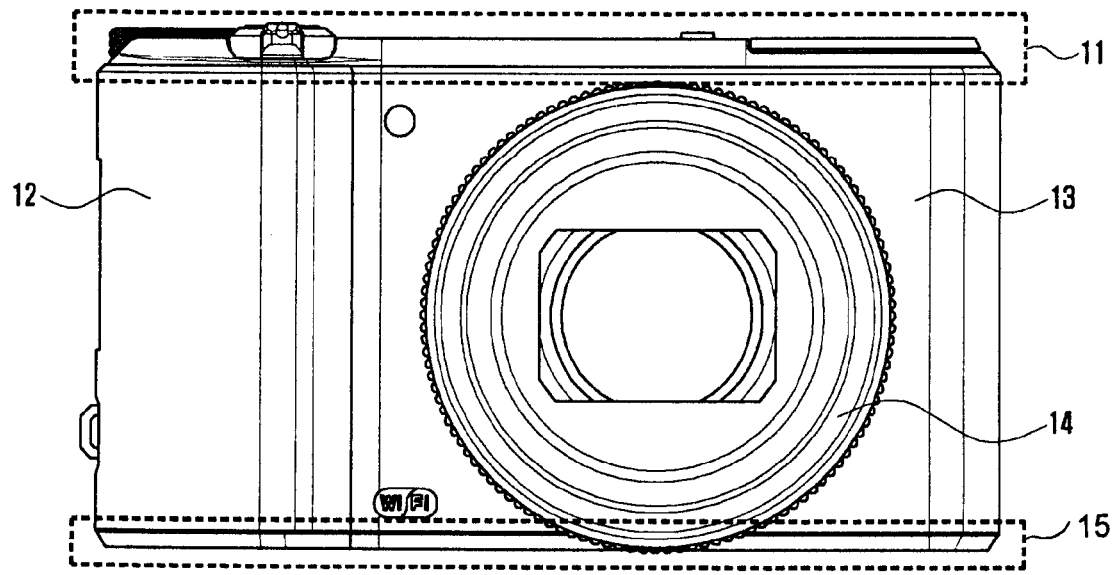
FIG. 1 is a perspective view illustrating a camera device having a conventional antenna.

Hereinafter, exemplary embodiments of the present invention are described in detail with reference to the accompanying drawings. The same reference numbers are used throughout the drawings to refer to the same or like parts. The views in the drawings are schematic views only, and are not intended to be to scale or correctly proportioned. Detailed descriptions of well-known functions and structures incorporated herein may be omitted to avoid obscuring the subject matter of the present invention.

Hereinafter, a camera device having an internal antenna according to exemplary embodiments of the present invention is described with reference to the drawings. The camera device (hereafter, just "camera") includes at least a camera function and a wireless communication function.

Embodiments of the invention provide a camera that enhances an external appearance quality by reducing a parting line. In one embodiment, this is done by composing an entire surface of the camera except for one side surface, with metal, and by composing the one side surface with an injection molding material. In another embodiment, at least a portion of a rear camera surface is also composed of injection molding material.

Further, embodiments provide a camera that efficiently uses space within the camera by arranging a plurality of antennas in a portion proximate to only one side surface, i.e., an injection grip portion within the camera. Space is further saved by avoiding the need to provide an area separated from a main board and an electrical element in order to reduce an antenna occupying area and antenna interference, as in conventional designs that disperse a plurality of antennas.

Moreover, embodiments provide a camera that enhances antenna gain by separately disposing internal antennas at an upper portion and a lower portion of the camera according to a main radiation direction and an operating frequency band of an internal antenna radiator.

Embodiments also provide a camera for protecting a plurality of input and output parts and enhancing an external appearance of the camera by covering several slots with one battery cover and for reducing a production process and a cost by reducing the number of parts for covering several slots.

Further, embodiments relate to a camera that can provide convenience to a user by using an auxiliary cover for independently opening and closing to a portion of a battery cover, for a frequently used external connection slot.

Figure 2:
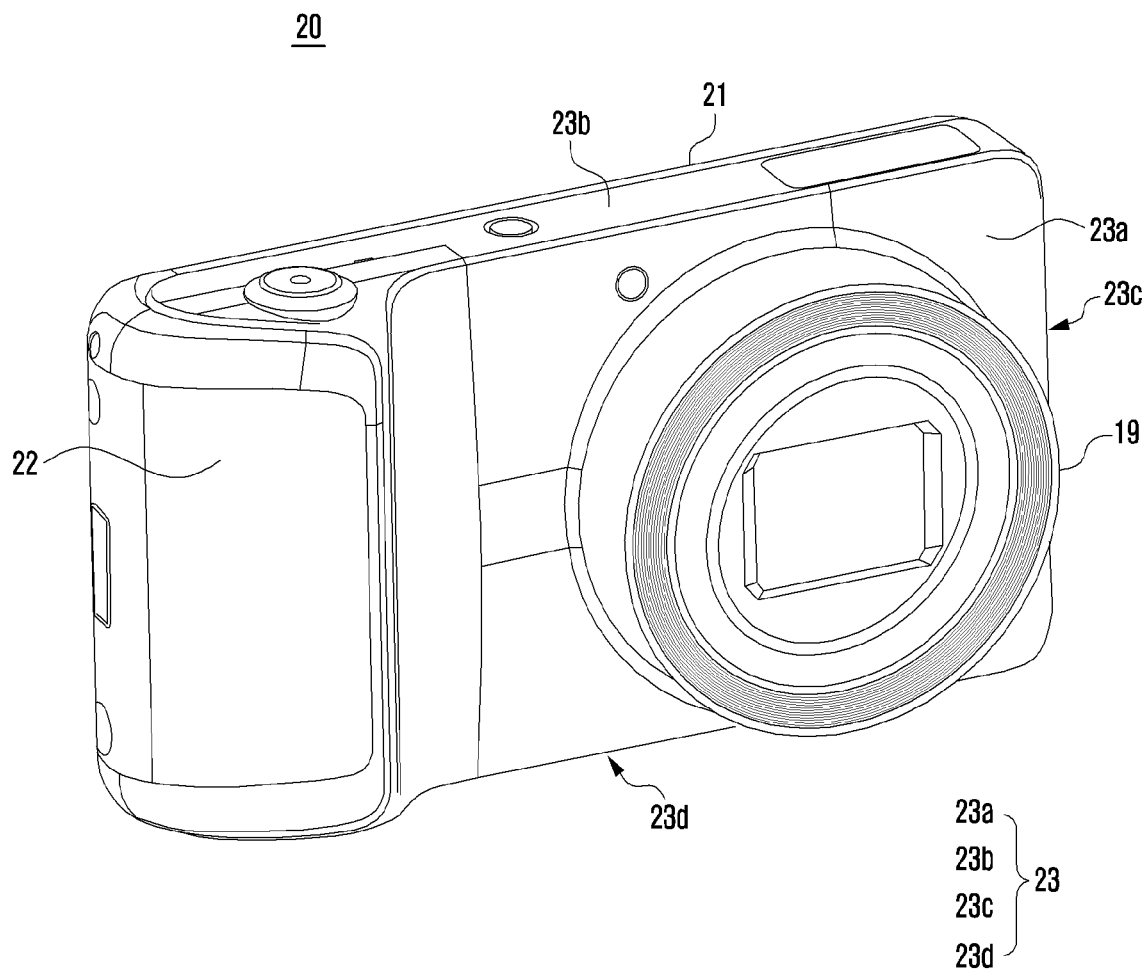
FIGS. 2 and 3 are perspective views illustrating a structure of a camera device having an internal antenna according to an exemplary embodiment of the present invention.
Figure 3:
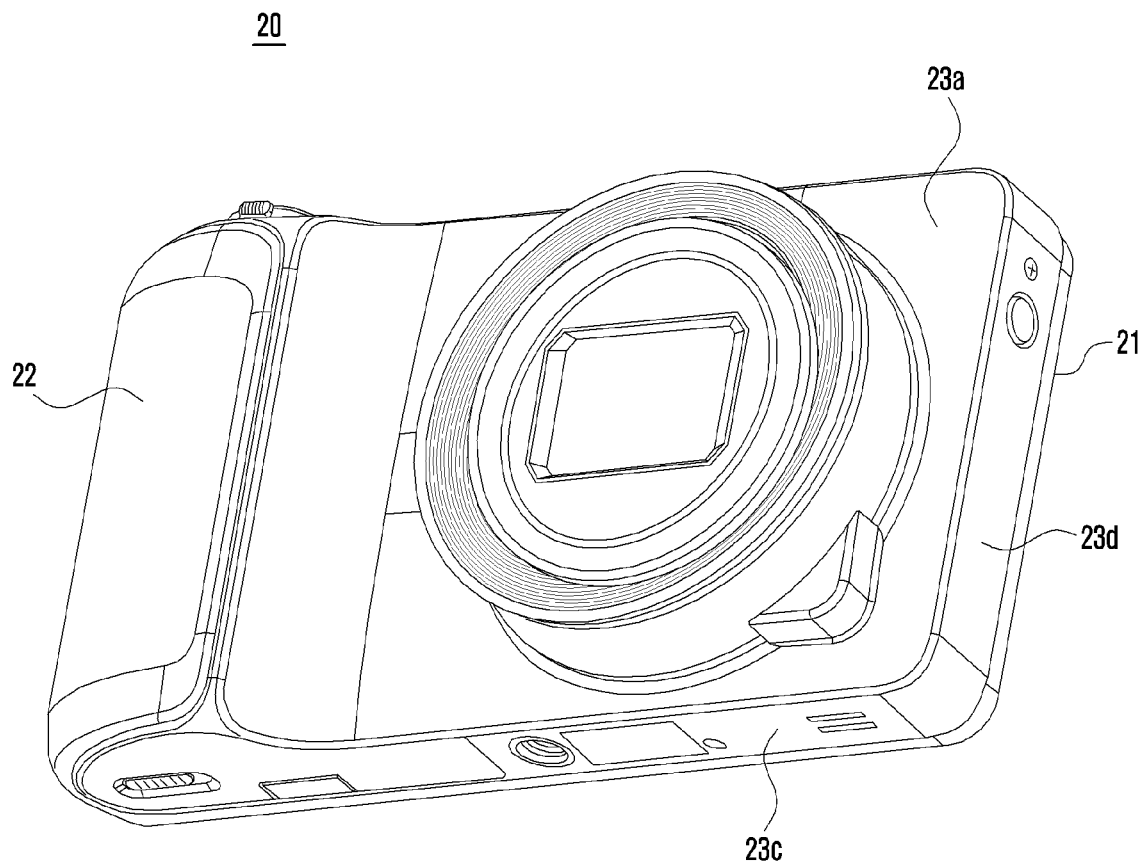

FIGS. 2 and 3 are perspective views illustrating a structure of a camera, 20, having an internal antenna according to an exemplary embodiment of the present invention. Camera 20 includes a metal body portion 23 and an injection grip portion 22.

In an embodiment, the metal body portion 23 is a metallic cover of the camera that encompasses an entire external surface except for one side surface 22 and a rear surface 21 of the camera. ("Surface" herein can refer not only to an external surface but to an entire thin body part having an external surface.) The side surface 22 will also be called herein an injection grip portion 22. The metal body portion 23 is comprised of a front portion 23a, and top, bottom and right side portions 23b, 23c and 23d, respectively (where the labels right and left herein are arbitrary and used to distinguish opposite lateral sides). Metal body portion 23 is a portion including a shutter button, a zoom lens adapter 19 having a plurality of lens therein, and a flash. Zoom lens adapter 19 may occupy a considerable portion of the front portion 23a. When zoom lens adapter 19 is substantially retracted, as in the states of FIGS. 2 and 3, the camera 20 has a generally solid rectangular shape, with a major front surface 23a and a major rear surface 21. (Hereafter, "surface" 23a, 23b, etc. will be used to mean either the external surface of the respective body portion 23a, 23b, etc., or, the respective body portion itself, from the outer to inner surface thereof. In some cases, "external surface 23a" will be used to refer specifically to the external surface of body portion 23a.) It is noted, in the various figures herein, the camera 20 has a "landscape type configuration" in which the camera is normally held with the long sides horizontal, and the grip portion 22 extends along a short (e.g., left) side of the camera 20. In an alternative configuration, the camera is configured in a "portrait type configuration" and normally oriented with the short sides horizontal. In this case, the grip portion 22 can be configured along a long side of the camera and still be oriented vertically.

The present exemplary embodiment illustrates an example in which the metal body portion 23 is comprised of the upper surface 23b, lower surface 23c, front surface 23a, and right side surface 23d, and does not include the left side surface 22 and the rear surface 21 of the camera. In this case, left side surface 22 and rear surface 21 can be made of an injection molding material. In an alternative embodiment, the rear surface 21 is made of metal, in which case the metal body portion 23 also includes the rear surface 21, and only the left side surface is non-metallic. In either of these embodiments, a parting line is reduced as compared to the conventional cameras described above. By reducing a parting line, an external appearance quality can be improved.

The injection grip portion 22 encloses one side portion of the camera 20 and is fastened to the metal body portion 23. Such fastening can be accomplished in a conventional manner. The injection grip portion 22 is a portion held by the user with one hand while the camera is in use. The injection grip portion 22 is formed by injection molding.

In the shown embodiment, the injection grip portion 22 is curvilinear from a rear surface to a front surface of the camera 20. The grip portion 22 wraps around the a side part of the camera so that a front part of the grip portion overlaps a front part of the camera, and a rear part of the grip portion overlaps a rear part of the camera.

Figure 4:
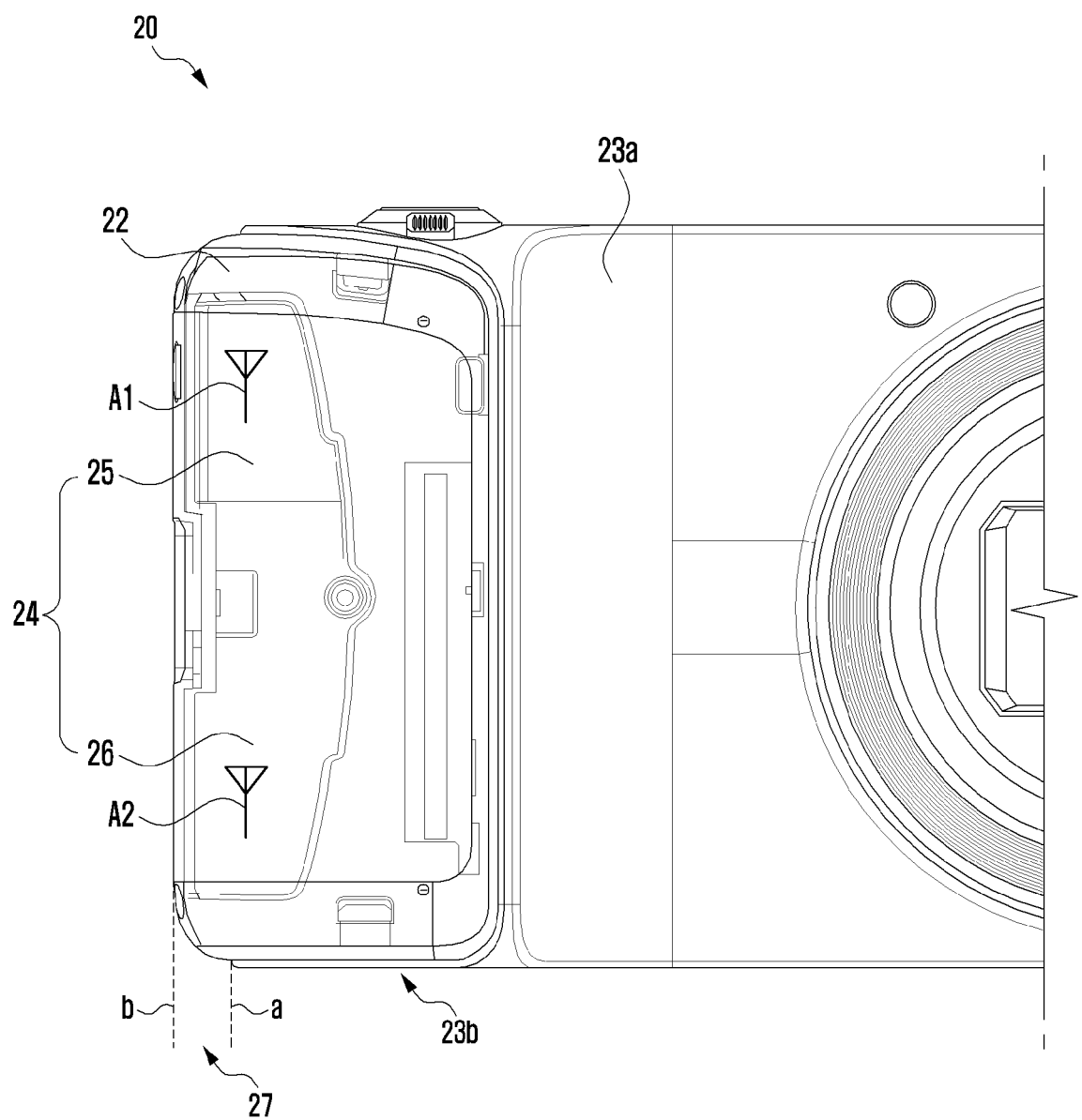
FIG. 4 is a partial perspective view illustrating an internal antenna unit of the camera device of FIG. 2.

FIG. 4 is a partial cut-away view of the front side of camera 20, illustrating an antenna unit housed within the camera of FIG. 2.

Referring to FIG. 4, an antenna portion 24 housed within the camera 20 is mounted within the injection grip portion 22. Particularly, in the present exemplary embodiment, by arranging a plurality of antennas at only one side surface, i.e., within the injection grip portion 22, an efficient use of internal camera space is achieved. In the antenna portion 24, an antenna radiator may be mounted on an antenna carrier, or when an antenna carrier is not provided, an antenna radiator may be mounted in an internal wall of the injection grip portion 22.

The antenna portion 24 may be comprised of a first antenna portion 25 provided in an upper portion of the camera 20 and a second antenna portion 26 provided in a lower portion of the camera. The first antenna portion 25 has at least one antenna radiator A1 and the second antenna portion 26 has at least one antenna radiator A2.

The first antenna portion 25 may mount an antenna radiator A1 of a frequency band higher than that of the antenna radiator A2 mounted in the second antenna portion 26 (or vice versa). In a specific application, first antenna portion 25 may mount an antenna radiator having a frequency band of 1.56 GHz or more. In an embodiment, first antenna portion 25 may mount at least one of a Bluetooth (BT) antenna, global positioning system (GPS) antenna, and Wi-Fi antenna, and the second antenna portion 26 may mount at least one of a global system for mobile communication (GSM) antenna, code division multiple access (CDMA) antenna, wideband code division multiple access (WCDMA) antenna, and diversity antenna.

A GPS antenna receives signals from GPS satellites, hence it is preferable to configure this antenna with a main lobe pointing vertical (up). For example, a GPS antenna can be mounted in the upper portion 25 in an upper portion of an antenna carrier. In order to avoid RF signal interference, a 3G antenna which typically transmits/receives signals to/from land-based base station antennas, can be mounted in the lower portion 26, in a lower portion of the same antenna carrier or a different antenna carrier. Thus a GPS function as well as a 3G communication function may be implemented within the camera 20.

In this way, by separately disposing internal antennas of a camera according to an exemplary embodiment in an upper portion and a lower portion of the camera as a function of a main radiation direction of an antenna radiator, efficiency of an antenna radiation gain can be enhanced. Further, the operating frequency bands of the respective antennas can also be factors impacting the choice of antenna positioning within camera 20.

Figure 5:
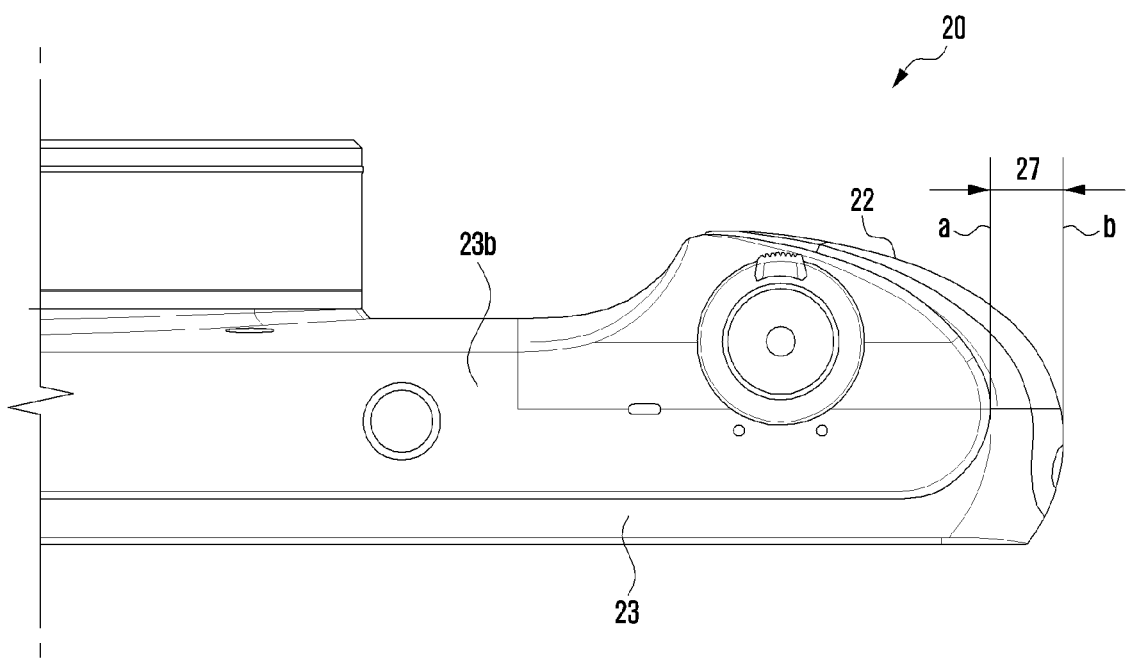
FIG. 5 is a partial plan view illustrating a structure of an injection grip portion for mounting an antenna portion of the camera device of FIG. 2.

FIG. 5 is a partial top view of camera 20, illustrating an exemplary structure of the injection grip portion 22. This example of injection grip portion 22 includes a non-metallic "radiation gain extension portion" 27 extended in lateral outward direction of the camera 20 from the injection grip portion 22. In the extension portion 27, the injection grip portion 22 is formed in a structure protruded by at least 3.0 mm from the boundary line "a" with the bottom metal body portion 23b, to a boundary line "b".

Particularly, in the present exemplary embodiment, the extension portion 27 provides extra room to arrange the antenna radiators so as to achieve a desired performance. In order to radiate electromagnetic waves from a radiator mounted at the inside to an upper portion and lower portion of the camera without disturbance or interference by a metal, the extension portion 27 can be provided along the entire side of the camera. As shown in FIG. 4, the extension portion 27 may have a structure extended to a side surface, an upper portion, and a lower portion adjacent to the antenna portion 24 or may have a structure extended to only an upper portion and a lower portion adjacent to the antenna portion 24. The illustrated shape is an example and may be changed.

However, as the extension portion 27 is formed with a plastic injection molding material that does not disturb or interfere with RF radiation, the extension portion 27 secures a radiation area that can radiate electromagnetic waves in all directions.

Further, in the extension portion 27, a metal or a metallic plating film is preferably not present in an adjacent area of the antenna portion 24. By extending the injection grip portion 22 formed by injection molding, an external appearance and a material of the injection grip portion 22 may have unity and an aesthetic impression.

Figure 6:
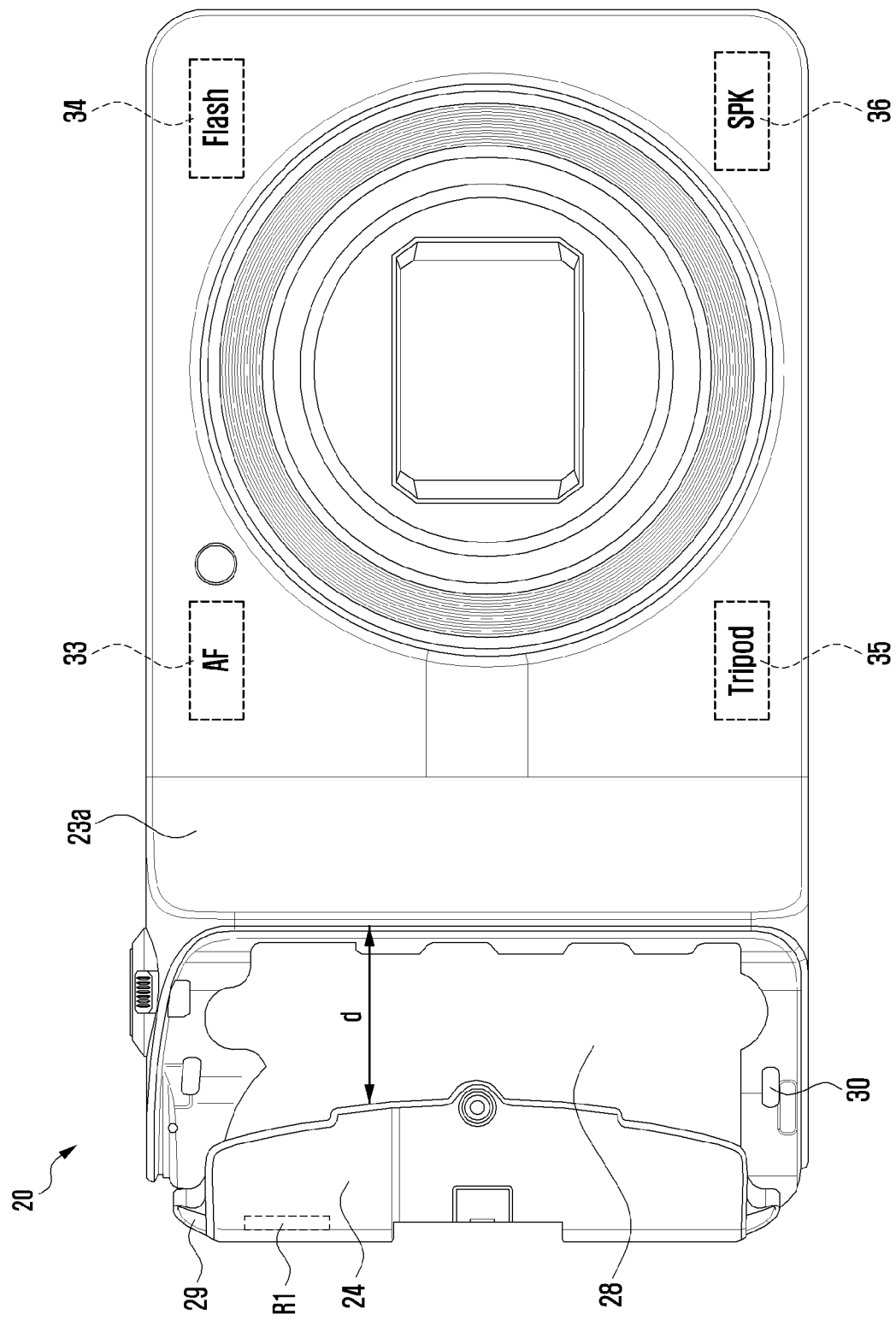
FIG. 6 is a front view illustrating a disposition structure of an antenna portion and a metal body portion of the camera device of FIG. 2.

FIG. 6 is a front view illustrating a disposition structure of an antenna portion and a metal body portion of the camera device of FIG. 2. As shown in FIG. 6, it is preferable that the antenna portion 24 of the present exemplary embodiment is separated by a distance "d" of at least 3.0 mm from the metal body portion 23a. For separation from the antenna portion 24, a portion of the metal body portion 23a that would be otherwise adjacent to the antenna portion 24, may be removed.

That is, an area of the metal body portion 23a (and an area of rear portion 21, if made of metal) adjacent to the antenna portion 24, except for fastening areas 29 and 30 for fastening between the metal body portion 23 and the injection grip portion 22 may be completely removed. The area removed from the metal body portion 23a is preferably removed to separate by at least 3.0 mm from the antenna portion 24, but the removal area is removed not to away from the injection grip portion 22.

In order to extend a radiation gain by reducing interference or disturbance of antenna radiation by the metal body portion 23, the removal area from the metal body portion 23 is preferably removed to separate by at least 3.0 mm from the antenna portion 24.

Further, only the antenna portion 24 is mounted within the injection grip portion 22, and elements such as the remaining Auto Focus (AF), tripod, flash, lens module, and speaker module may be disposed only at the inside and the outside of the metal body portion 23 separated from the antenna portion 24. That is, parts such as the remaining AF 33, flash 34, tripod 35, speaker module 36, and lens module, except for the antenna may be disposed at the side opposite to the antenna.

Unlike a state in which a plurality of antennas are dispersedly disposed within the camera, as in the conventional art, in the present invention, as antennas A1, A2 are gathered at one side and are disposed with an optimized radiation efficiency according to a characteristic thereof, an antenna occupying area is minimized, and various parts converged to the camera can be efficiently arranged, and efficiency of a radiation performance can be enhanced.

Figure 7:
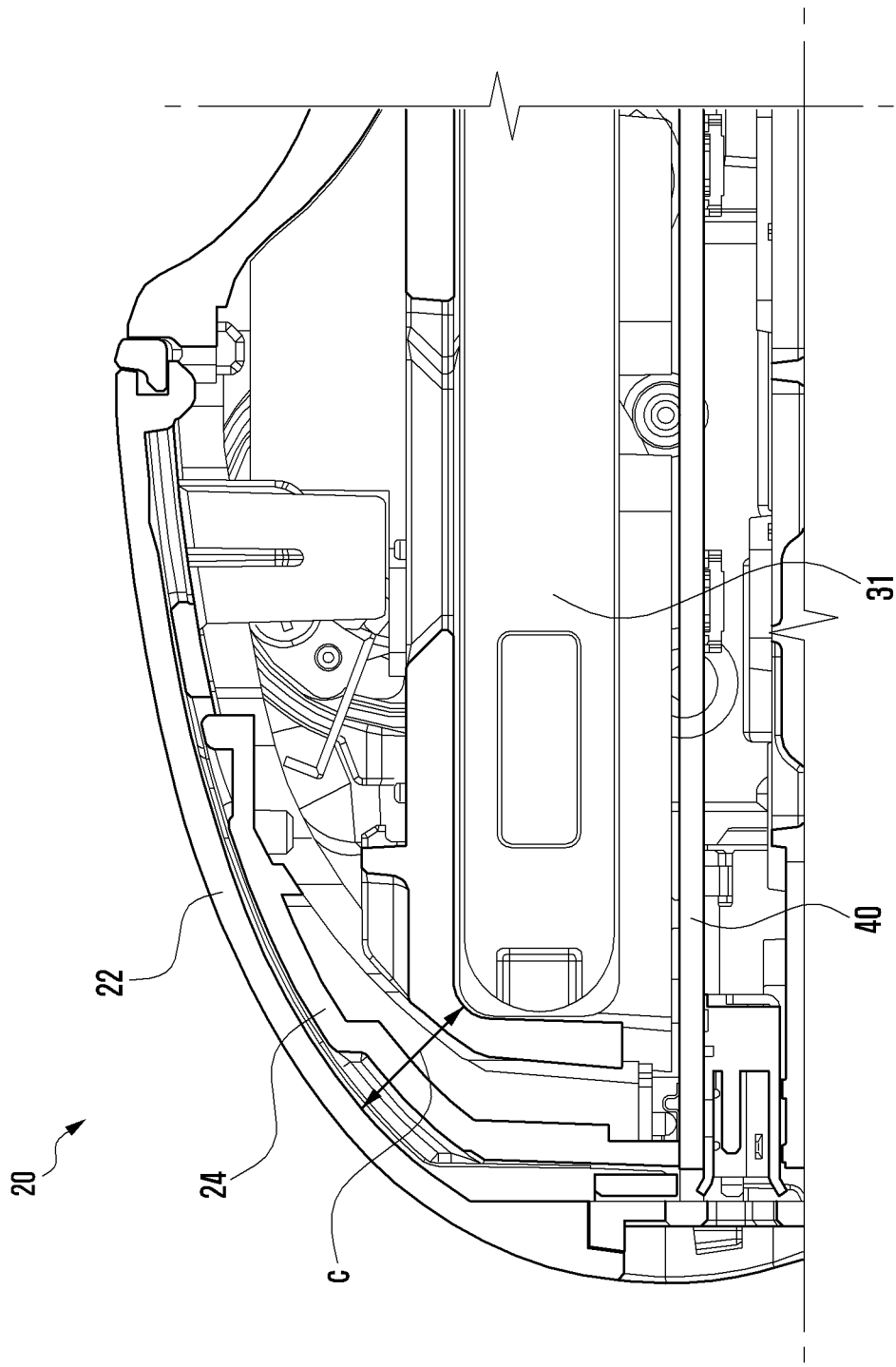
FIG. 7 is a partial bottom view illustrating a disposition structure between a battery and an antenna portion of the camera device of FIG. 2.

FIG. 7 is a partial bottom view illustrating a disposition structure between a battery and an antenna portion of the camera 20 of FIG. 2. As shown in FIG. 7, it is preferable that the antenna portion 24 according to the present exemplary embodiment is separated by a distance c of at least 3.0 mm from a battery 31 provided within the camera 20.

Although not shown, in order to shield electromagnetic waves generated from an electrical/electronic element such as a main board 40, battery 31, plug, and connector, an electromagnetic wave shielding film in which copper and nickel are sequentially plated may be further provided between the antenna portion 24 and the metal body portion 23.

Radiator patterns mounted in the antenna portion 24 are electrically connected ("RF connected") to the main board 40 through a connector at a predetermined position of the antenna portion 24 to receive supply of power or to transfer a received signal. Suitable connection means and structures are known to those of skill in the art, thus a detailed description thereof is omitted for brevity.

Figure 8:
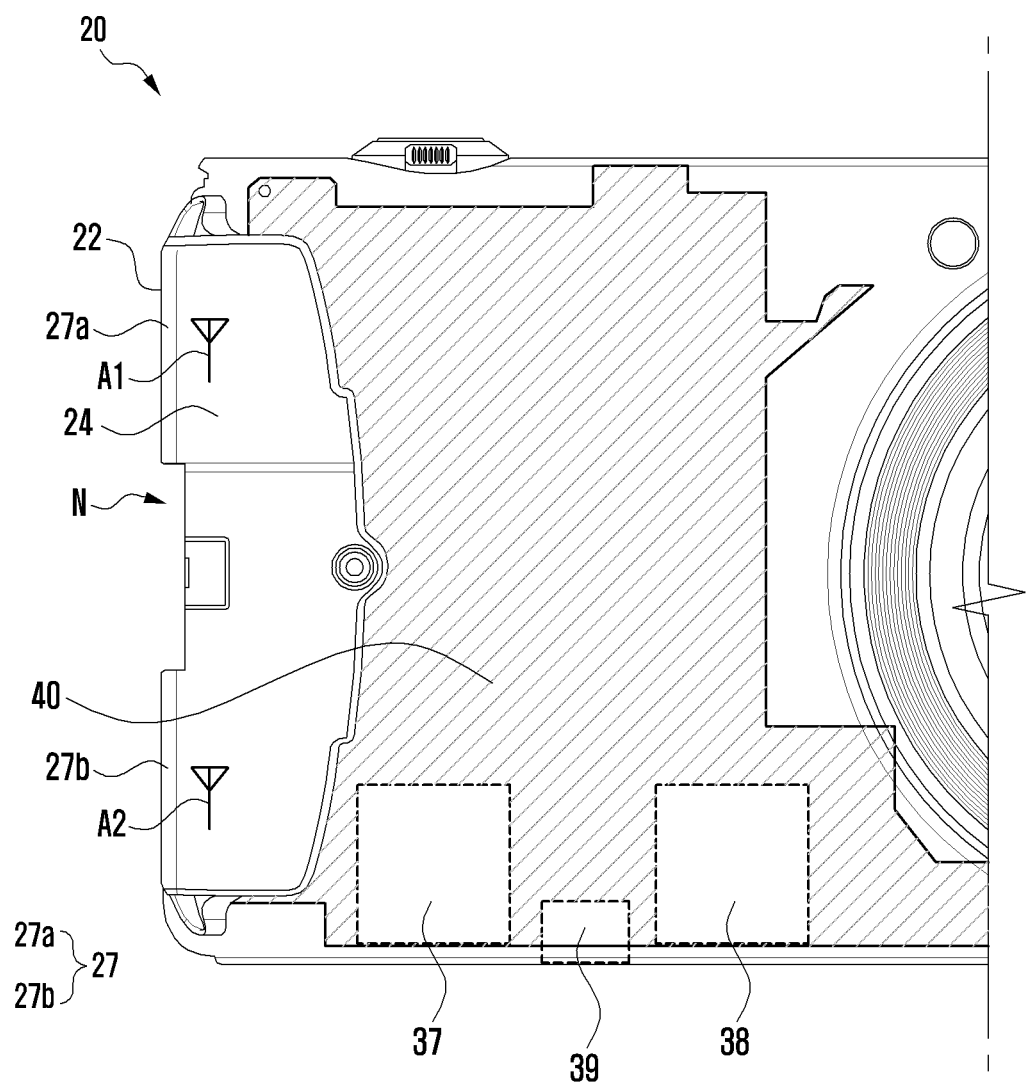
FIG. 8 is a partial front view illustrating a disposition structure between an antenna portion and an electrical element of the camera device of FIG. 2.

FIG. 8 is a partial front view illustrating a disposition structure between an antenna portion and an electrical element of the camera device of FIG. 2. As mentioned above, it is preferable that the antenna portion 24 according to the present exemplary embodiment is separated by a predetermined gap from electrical elements provided within the camera. Here, "electrical element" refers to internal parts that have interference or an influence in electromagnetic wave radiation of an antenna. Examples of electrical elements include the battery 31, SD memory card 37, SIM card 38, and socket 39 for performing electrical connection between parts of the camera 20.

Further, it is desirable to separate the antennas by a predetermined distance (e.g., at least 3 mm) from any metal part having a size of at least 3.0 mm×3.0 mm×0.8 t (where "t" is thickness in mm) among parts mounted in the main board 40. Adequate separation of these parts prevents performance deterioration of the antenna portion 24.

The battery 31, plug 39, SD memory card 37, and SIM card 38 are separated by a predetermined distance from the antenna portion 24, and the battery 31, plug 39, SD memory card 37, and SIM card 38 are separated by a predetermined distance from each other, thereby preventing an electrical or physical influence from each other. In this way, a camera having an internal antenna according to an exemplary embodiment of the present invention prevents deterioration of a radiation characteristic of an antenna by metal parts installed at a periphery of the antenna and thus a stable radiation gain of a camera antenna can be attained.

In the example of FIG. 8, it is seen that the extension portion 27 can be comprised of an upper extension portion 27a within which the first antenna radiator A1 is disposed, and a lower extension portion 27b within which the second antenna radiator A2 is disposed. For example, the radiators A1, A2 can be formed on inside walls of the extension portions, or on carriers adjacent the inside walls. The central side portion of the grip can be formed without an extension (or with less of an extension), and thus a notch N can be formed at the central portion, allowing for an ergonomic grip structure.

Figure 9:
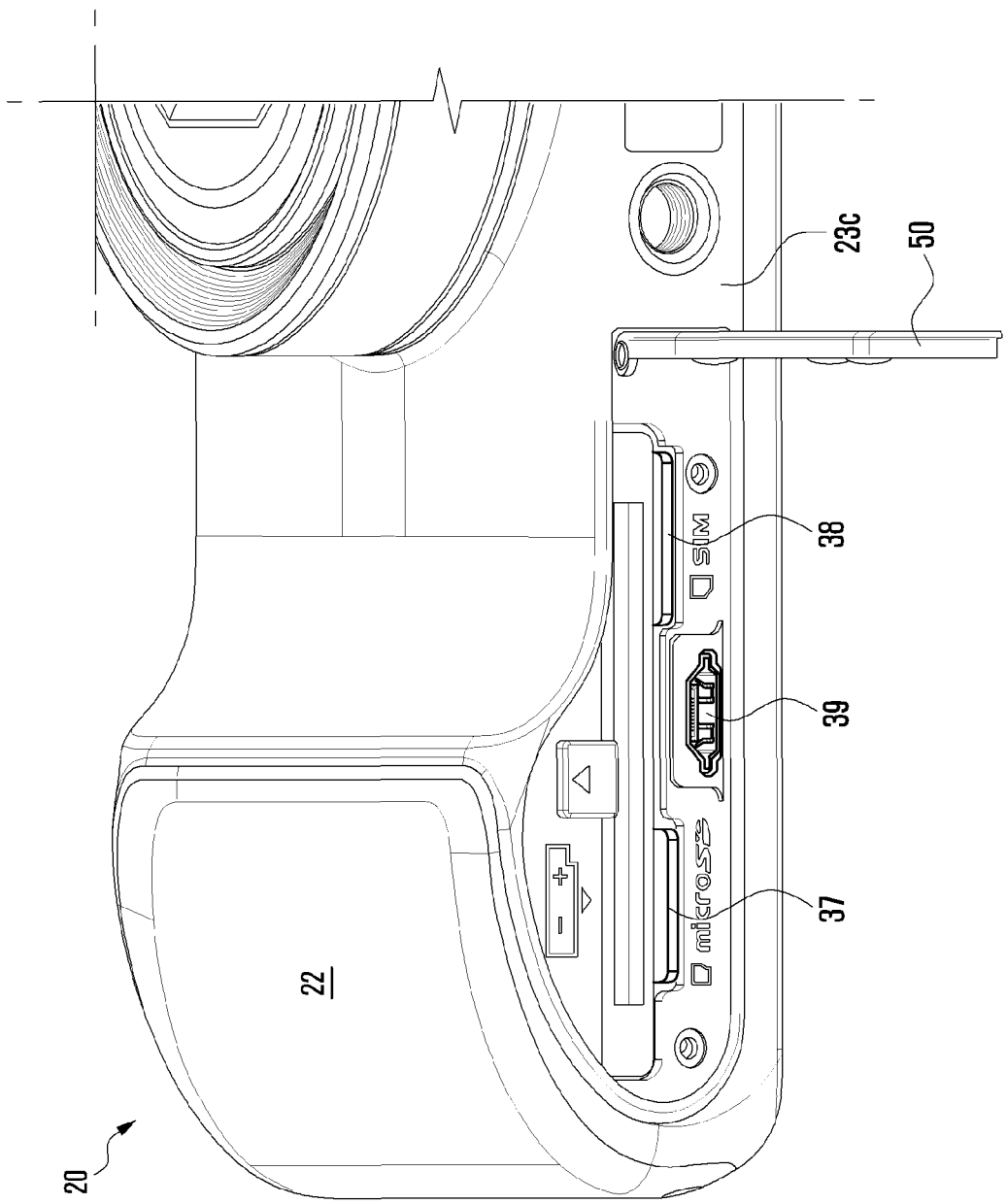
FIG. 9 is a partial perspective view illustrating an opened structure of a battery cover, which is a portion of a metal body portion of the camera device of FIG. 2.
Figure 10:
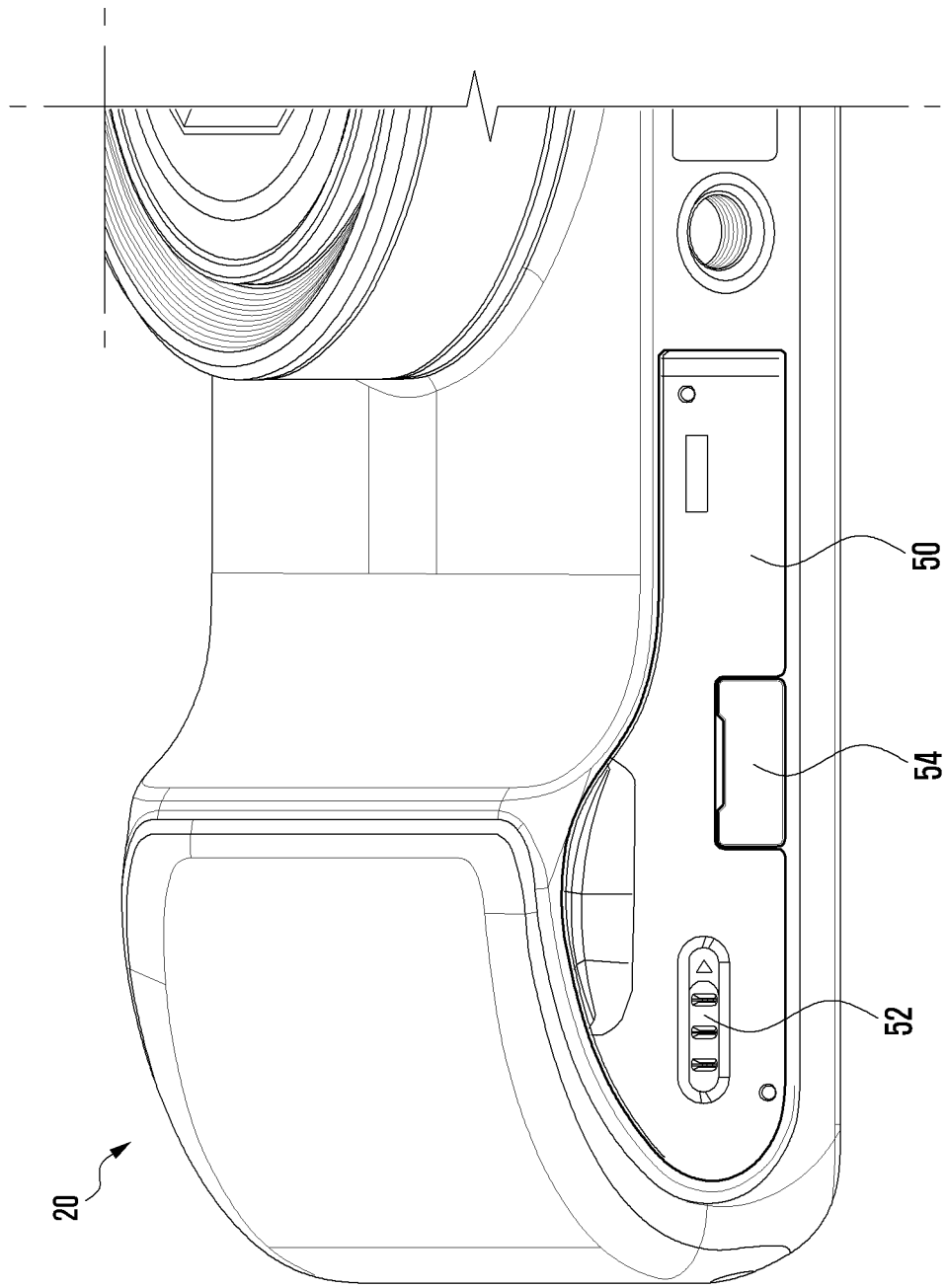
FIG. 10 is a partial perspective view illustrating a structure of a closed battery cover in the camera device of FIG. 2.

FIG. 9 is a partial perspective view illustrating an opened structure of a battery cover, which is a portion of a metal body portion of the camera 20. FIG. 10 is a partial perspective view illustrating a structure of a closed battery cover in the camera 20.

Referring to FIG. 9, camera 20 includes a plurality of slots for mounting an insertion and discharge (ejection) element (e.g., 37, 38, shown inserted within respective slots) at the lower surface 23c thereof, an electrical connector 39 for connecting to external parts, and a battery cover 50.

Here, the insertion and discharge element is formed to insert and discharge to and from the camera, and a card type insertion and discharge element is generally used. In order to provide various services such as authentication, monetary transaction accounting, and a security function, the insertion and discharge element may be, for example a subscriber identification module (SIM) card or an USIM card that stores individual information.

Further, the insertion and discharge element can be a memory card for storing and providing information and may be a storage medium such as a security digital (SD) card, micro-SD memory card, mini SD memory card, compact flash (CF) card, memory stick (MS) card, smart media (SM) card, and multimedia card (MMC).

The battery cover 50 is opened and closed by the slide button 52 (see FIG. 10) at the lower surface 23c of camera 20. That is, the battery cover 50 selectively shields the battery 31 by the slide button 52. For example, when sliding the slide button 52 in the shown arrow direction, the battery cover 50 may be opened using a spring 60 rotatably mounted at one side of the battery cover 50 as a rotation axis.

Referring to FIG. 10, by providing an auxiliary cover 54 in a portion of the battery cover 50, a cover for the connector 39 for connecting to frequently used external parts can be separately opened and closed. That is, in order to easily access the connector 39 without opening the battery cover 50, the auxiliary cover 54 is formed to open and close a portion of the battery cover 50. The auxiliary cover 54 may be formed in a cover for covering the connector 39, as shown in FIG. 10.

Figure 11:
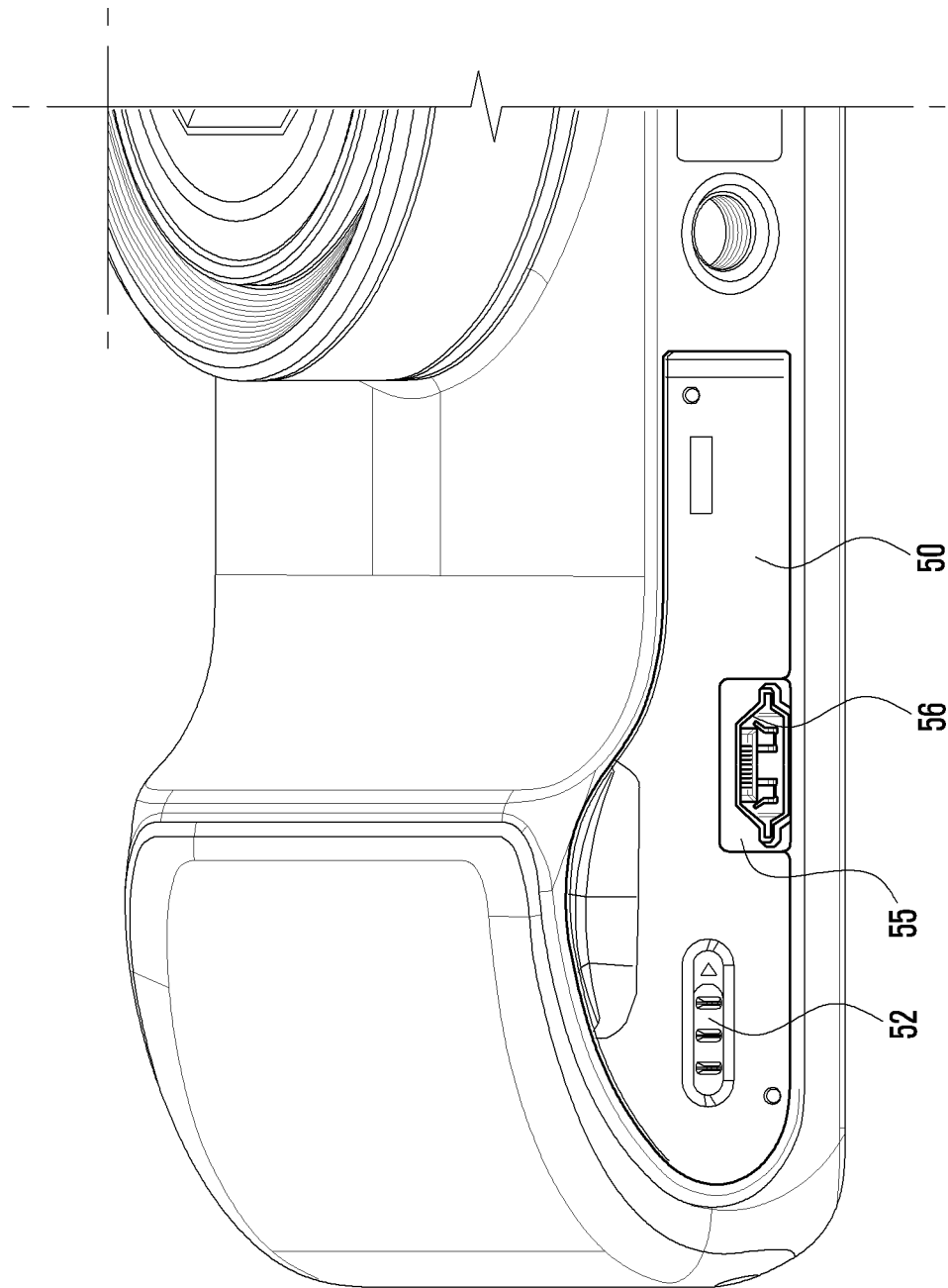
FIG. 11 is a partial perspective view illustrating a structure of the closed battery cover with an auxiliary battery cover removed.

FIG. 11 is a partial perspective view illustrating a structure of the closed battery cover, with the auxiliary battery cover opened or removed. The auxiliary battery cover 54 is in a location of a cut-out 55 of the battery cover 50. The auxiliary cover 54 may correspond substantially to an area in which only the HDMI connector 56 is exposed when the cover 54 is opened.

Figure 12:
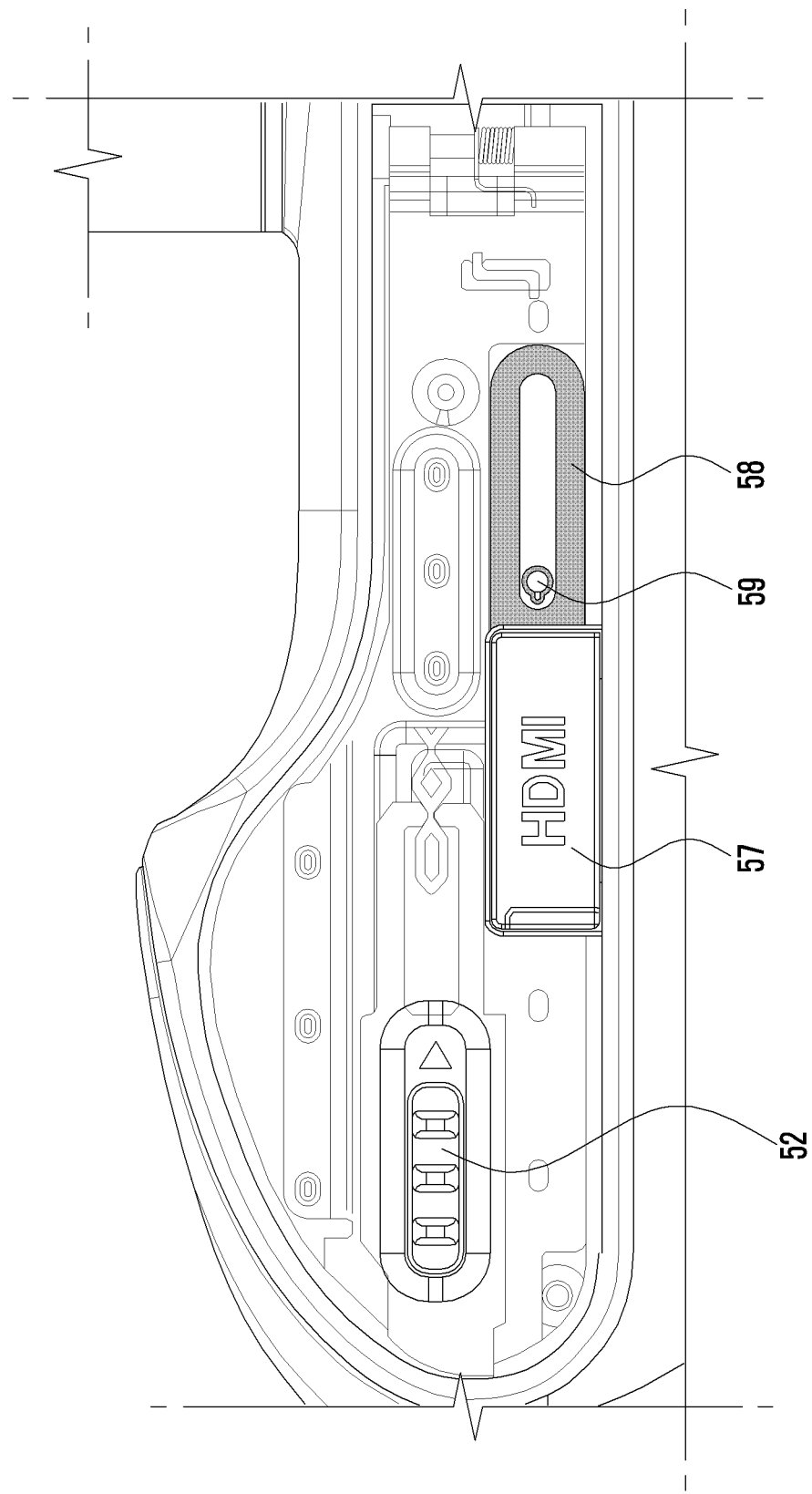
FIGS. 12 and 13 are partial bottom views illustrating a lower surface of a camera device including an alternative embodiment of a battery cover.
Figure 13:
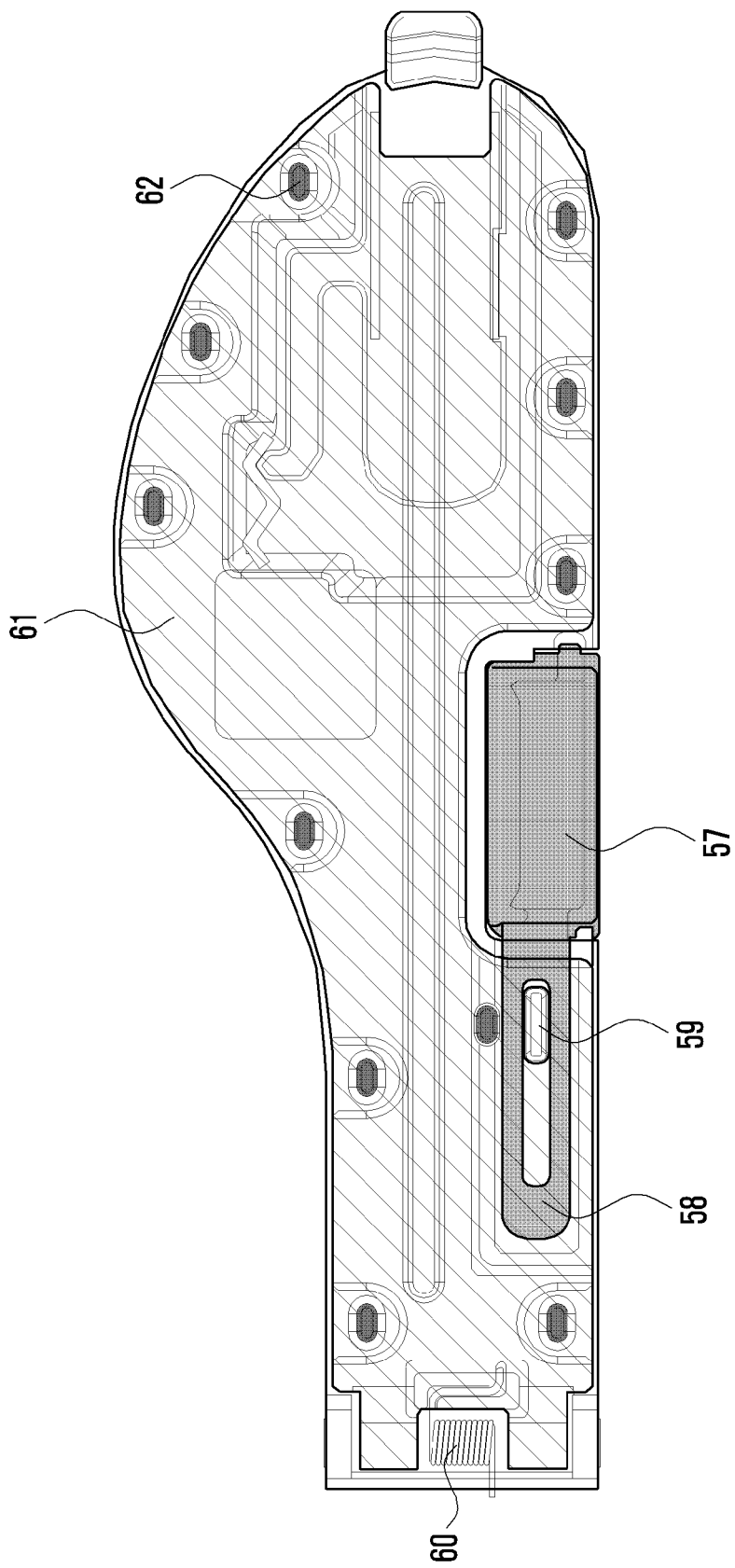

FIGS. 12 and 13 are partial bottom views illustrating a lower surface of camera 20 including an alternative embodiment of a battery cover. Here, one side 57 of the auxiliary cover may be exposed to the outside of the camera, and the other side 58 thereof may be formed in an auxiliary cover mounted at the inside of the camera. Specifically, one side 57 of the auxiliary cover may be opened by lifting in an outward direction, and when the one side 57 is lifted, the other side 58 connected to one side 57 may perform a sliding movement in a direction of the one side 57. In this case, the sliding movement of the other side 58 is restricted by a stopper 59 fixed to the inside.

In such a structure of an auxiliary cover, even in a state in which the connector 39 is separated from the battery cover 50 and is opened, the connector 39 is not completely separated from the battery cover 50 and maintains a coupled state and an external plug in the connector 39 is thus prevented from being detached. Further, because independent opening and closing of only a slot such as a frequently used connector is allowed, convenience and stability can be provided to a user.

The auxiliary cover 54 can be made of an elastic material to easily detach by a predetermined force from a camera main body case. The elastic material may be urethane or rubber.

Conventionally, the battery cover 50 exclusively opens and closes only the battery 31, and a structure in which a slot and a connector for the injection and discharge element are opened and closed by separated covers was used. Because a plurality of covers should be each disposed at an outer edge of the camera, such a structure does not have a smooth surface, and each cover takes off by a friction or an impact from the outside and thus the slot may be damaged or the injection and discharge element may be lost.

A battery cover according to an exemplary embodiment of the present invention can have a structure that can cover at one time a plurality of slots for mounting a plurality of insertion and discharge elements including a battery. Therefore, in the present invention, by covering several slots with a battery cover, a plurality of insertion and discharge elements can be protected, and the camera can have an enhanced external appearance. Further, by reducing the number of parts for covering several slots, a production process and a cost can be reduced.

Further, for a slot for connecting frequently using external parts, by using an auxiliary cover that can independently open and close at a portion of a battery cover, convenience can be provided to the user.

As described above, a camera having an internal antenna according to the present invention has a non-metallic grip portion housing at least one antenna on one side portion of the camera. Optionally, this grip portion has a non-conductive radiation gain extension area extended in an outward (e.g., lateral) direction of the camera, and the at least one antenna is disposed in extension area, improving antenna performance by increasing the distance between metallic elements within the camera.

Further, by forming an entire external surface, except for one side surface, or one side surface and at least a portion of a rear surface, of the camera with metal and by covering the one side surface, i.e., a hand gripping area with an injection molding material, a parting line is reduced and an external appearance quality can be enhanced.

It is noted here that instead of injection molding, alternative methods of producing the grip portion 22, such as via 3D printing, are possible in alternative embodiments.

Further, by covering a slot for mounting parts such as a memory card or a SIM card that can be inserted and discharged using a rotatable battery cover, the parts can be protected from an external physical force, an impact, or contamination.

Further, by efficiently disposing antennas mounted within the camera, while preventing interference with another electrical element, layout efficiency can be maximized and thus the camera can be formed in a small size and thickness.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:

1. A camera having an internal antenna, comprising:
a metal body portion forming an external surface of the camera, the metal body portion excluding one side surface of the camera but including at least a front surface portion and a top surface portion that extends from the front surface portion to a rear side of the camera;
a non-metallic grip portion comprising the one side surface and fastened to the metal body portion; and
an antenna portion disposed within an interior of the grip portion, and having at least a first antenna radiator disposed at an upper part of the one side surface and a second antenna radiator disposed at a lower part of the one side surface.

2. The camera of claim 1, wherein the grip portion includes a radiation gain extension portion, which extends the grip portion at least at upper and lower parts thereof, the first radiator is disposed within the extension portion at the upper part and the second radiator is disposed within the extension portion at the lower part, and the grip portion being formed with a recess in a central region thereof, the first and second radiators being located above and below the recess, respectively.

3. The camera of claim 2, wherein the radiation gain extension portion is formed by plastic injection molding.

4. The camera of claim 2, wherein the radiation extension portion is protruded by at least 3.0 mm from the metal body portion adjacent to the one side surface of the camera.

5. The camera of claim 1, wherein the antenna portion is separated into a first antenna portion adjacent to an upper portion of the camera and a second antenna portion adjacent to a lower portion of the camera.

6. The camera of claim 5, wherein the first antenna portion includes a radiator operating at a higher frequency band higher than that of a radiator of the second antenna portion.

7. The camera of claim 5, wherein the radiator of the first antenna portion is optimized at a frequency band of 1.56 GHz or more.

8. The camera of claim 5, wherein the first antenna portion includes at least one of a Bluetooth (BT) antenna, global positioning system (GPS) antenna, and Wi-Fi antenna, and
the second antenna portion includes at least one of a global system for mobile communication (GSM) antenna, code division multiple access (CDMA) antenna, wideband code division multiple access (WCDMA) antenna, and diversity antenna.

9. The camera of claim 1, wherein the antenna portion is separated by at least a predetermined distance from each of the metal body portion, and an electrical element provided within the camera.

10. The camera of claim 9, wherein the antenna portion is separated by 3 mm or more from each of the metal body portion and the electrical element provided within the camera.

11. The camera of claim 9, wherein the antenna portion is separated by at least the predetermined distance from each of a plurality of electrical elements which comprise an SD memory card and a SIM card provided in a lower end portion of the metal body portion.

12. The camera of claim 1, wherein the camera is of a generally solid rectangular shape, the one side surface is a left or right side surface, and the metal body portion forms at least an upper surface, lower surface, front surface, and the other of the left and right side surface of the camera.

13. The camera of claim 12, wherein the metal body portion further comprises a rear surface of the camera.

14. The camera of claim 1, wherein the grip portion is curvilinear from a rear surface to a front surface of the camera, the grip portion wrapping around a side part of the camera so that a front part of the grip portion overlaps a front part of the camera, and a rear part of the grip portion overlaps a rear part of the camera.

15. The camera of claim 1, wherein the metal body portion comprises a battery cover rotatably mounted at a lower surface of the camera to access a battery provided within the camera.

16. The camera of claim 15, wherein the battery cover simultaneously covers at least one slot for receiving and discharging an insertion and discharge element and at least one connector for receiving an external jack.

17. A camera having an internal antenna, comprising:
a metal body portion forming an external surface of the camera, the metal body portion excluding one side surface of the camera:
a non-metallic grip portion comprising the one side surface and fastened to the metal body portion; and
an antenna portion having at least one radiator within the grip portion;
wherein the metal body portion comprises a battery cover rotatably mounted at a lower surface of the camera to access a battery provided within the camera and at least one slot for receiving and discharging at least one insertion and discharge element, the battery cover comprises an auxiliary cover that simultaneously covers at least one HDMI connector for receiving HDMI cable and that independently opens and closes in a portion of the battery cover corresponding to the HDMI connector while a remaining portion of the battery cover is closed.

18. The camera of claim 17, wherein the auxiliary cover has a structure in which one side is exposed to the outside of the camera and in which a second side connected to the one side is mounted within the camera and when the one side is lifted in an outward direction of the camera, the second side performs a sliding movement in a direction of the one side, wherein the sliding movement is restricted by a stopper fixed within the camera.

19. A camera comprising:
a metal body portion forming an external surface, excluding one side surface of the camera, and for housing a flash module, a speaker module, an autofocus (AF) module, and a tripod module; and
an injection grip portion enclosing the one side surface of the camera and for housing an antenna module separated by at least a predetermined distance from the metal body portion,
wherein the metal body portion comprises a battery cover for covering and accessing a battery, an HDMI connector, an SD memory card, and a SIM card, each being separated by at least the predetermined distance internally from the antenna module, and detachably mounted at a lower end portion of the metal body portion to simultaneously cover the battery, HDMI connector, SD memory card, and SIM card, and having an auxiliary cover for independently opening and closing to access the HDMI connector in a portion of the battery cover while a remaining portion of the battery cover is closed.

20. The camera of claim 19, wherein the injection grip portion comprises an extension portion protruded in an outward direction of the camera, the antenna module being disposed within the extension portion.

* * * * *

UNITED STATES PATENT AND TRADEMARK OFFICE
CERTIFICATE OF CORRECTION

| | | |
|---|---|---|
| PATENT NO. | : 9,137,431 B2 | Page 1 of 1 |
| APPLICATION NO. | : 13/975633 | |
| DATED | : September 15, 2015 | |
| INVENTOR(S) | : Jongmin Choi et al. | |

It is certified that error appears in the above-identified patent and that said Letters Patent is hereby corrected as shown below:

IN THE CLAIMS

Column 11, Claim 17, Lines 6-7 should read as follows:
--...the camera; a non-metallic...--

Column 11, Claim 17, Line 17 should read as follows:
--...receiving an HDMI cable...--

Signed and Sealed this
Fifth Day of January, 2016

Michelle K. Lee
*Director of the United States Patent and Trademark Office*